US011893975B1

(12) United States Patent
Butler et al.

(10) Patent No.: US 11,893,975 B1
(45) Date of Patent: Feb. 6, 2024

(54) HIGH AMPLIFICATION FLEXTENSIONAL TRANSDUCTION AND DEVICES

(71) Applicant: The Government of the United States of America as represented by the Secretary of the Navy, Newport, RI (US)

(72) Inventors: Stephen C Butler, Portsmouth, RI (US); Dimitri Donskoy, Fair Haven, NJ (US); Jason E Gaudette, Portsmouth, RI (US)

(73) Assignee: The United States of America as represented by the Secretary of the Navy

(*) Notice: Subject to any disclaimer, the term of this patent is extended or adjusted under 35 U.S.C. 154(b) by 0 days.

(21) Appl. No.: 17/307,165

(22) Filed: May 4, 2021

(51) Int. Cl.
*G10K 9/12* (2006.01)
*H04R 17/00* (2006.01)

(52) U.S. Cl.
CPC ............. *G10K 9/121* (2013.01); *H04R 17/00* (2013.01)

(58) Field of Classification Search
CPC ................................ G10K 9/121; H04R 17/00
See application file for complete search history.

(56) References Cited

U.S. PATENT DOCUMENTS

| | | | | |
|---|---|---|---|---|
| 3,277,433 A | 10/1966 | Toulis | | |
| 4,845,688 A | 7/1989 | Butler | | |
| 8,159,114 B2 * | 4/2012 | Rahman | H02N 2/023 | 310/328 |
| 8,659,209 B2 * | 2/2014 | Rahman | F03G 7/065 | 310/328 |
| 2010/0308689 A1 * | 12/2010 | Rahman | E21B 41/00 | 60/527 |
| 2011/0317515 A1 * | 12/2011 | Tenghamn | G10K 9/121 | 367/20 |
| 2012/0217845 A1 * | 8/2012 | Rahman | E21B 41/00 | 310/328 |

FOREIGN PATENT DOCUMENTS

| | | | | |
|---|---|---|---|---|
| EP | 2208242 A2 * | 7/2010 | E21B 23/00 |
| GB | 2466745 A * | 7/2010 | E21B 23/00 |
| WO | WO-2009056832 A3 * | 10/2009 | E21B 23/00 |

OTHER PUBLICATIONS

Zhang, Advanced Mechatronics and MEMS Devices, pp. 28-31, 2013 (Year: 2013).*
Takeshi Yano, Sze Keat Chee, Kazuo Yakuwa, Saburo Harada, Toshiro Higuchi, a New Type of Mechanical Transformer with High Stroke Magnification Ratio, Conference paper, pp. 71-74, Actuator 2008, Tokyo, Japan.

* cited by examiner

*Primary Examiner* — Daniel Pihulic
(74) *Attorney, Agent, or Firm* — James M. Kasischke; Michael P. Stanley; Jeffry C. Severson

(57) ABSTRACT

A linear transducer is connected to a first flexible member that has a first elongated shape with a first minor axis and a first major axis perpendicular to each other. This connects the linear transducer to opposite portions of the first flexible member along the first major axis. A second flexible member having an elongated shape with a second minor axis and a second major axis is provided. The second flexible member is connected to the first flexible member such that portions on the second major axis are joined to move with portions of the first flexible member on the first minor axis. Operation of the linear transducer multiplies displacements of the second flexible member relative to those of the transducer.

3 Claims, 14 Drawing Sheets

HIGH AMPLIFICATION FLEXTENSIONAL TRANSDUCTION AND DEVICES

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS REFERENCE TO OTHER PATENT APPLICATIONS

None.

BACKGROUND OF THE INVENTION

(1) Field of the Invention

The present invention is directed to electro-mechanical transduction and more particularly to amplification of transduction action.

(2) Description of the Prior Art

Flextensional transducers utilize mechanical amplification of elongated shells, X-springs, bended bars, and the like, hereafter referred as a flextensional member, flexible member, flex member, or just flex. Flexes convert high force/low displacement input into lower force/higher displacement output for transducers, e.g., actuators, tweezers/grippers, or acoustic transmitters. They can also transform lower force/higher displacement input into high force/low displacement output. This can be used in acoustic or displacement/velocity sensors.

Flextensional transducers are known and widely used for various applications e.g., civilian and military sonar systems, precision actuators and grippers for micro-machining and bio-medical applications, transducers for oil and gas services, underwater communications, steel production, injection molding, die casting, chemical production, etc. U.S. Pat. No. 3,277,433 (incorporated herein by reference) describes a flextensional transducer including a shell having orthogonally disposed longer and shorter shell axes and a transduction drive in the form of a piezoelectric stack. In operation, the high force/low displacement piezoelectric stack expands along the longer axis of the shell causing shell amplified displacement along its shorter axis. The amplification factor is approximately equal to the ratio of longer/shorter axis lengths and is essentially a leverage ratio.

The electro-mechanical transduction factor represents the amplification for the given input. This quantifies the ability of the transducer to convert electric energy into mechanical motion. The process is reversible, i.e., the same transduction mechanism can be utilized for converting mechanical input into electrical signal enabling various sensing devices, such as hydrophones, displacement or velocity sensors, etc. There are numerous implementations of this basic transduction approach described and available in public domain. For example, U.S. Pat. No. 4,845,688 (incorporated herein by reference) presents various arrangements utilizing the flextensional transduction approach. One such arrangement involves a series connection of multiple transducers to increase the output deformation by summing deformations from each individual transducer. Thus, two connected in series transducers will double the output displacement, three connected transducers will triple the output, etc. The increased output does not translate into an increased electro-mechanical transduction factor of the assembly, as each transducer requires its own driver, i.e., the total electrical input is increased respective to the number of transducers.

Another approach to increase the output displacement of the electro-mechanical transduction using mechanical levers is described by Takeshi Yano et al. ["A New Type of Mechanical Transformer with High Stroke Magnification Ratio," *ACTUATOR* 2008: 11$^{th}$ *International Conference on New Actuators*, Bremen, Germany, 9-11 Jun. 2008, p. 71-74]. Essentially, the described "mechanical transformer" utilizes the same flextensional leverage principle repackaged as a lever and a spring.

SUMMARY OF THE INVENTION

According to an embodiment of the invention, in apparatuses and methods herein an actuator is operatively connected to a first flexible member. The first flexible member has a first elongated shape and the first elongated shape has a first minor axis and a first major axis. The first minor axis is perpendicular to the first major axis, and the first minor axis is shorter than the first major axis. The process of connecting the actuator to the first flexible member connects the actuator to opposite ends of the first flexible member along the first major axis.

With such structures, a second flexible member is connected to the first flexible member. The second flexible member has a second elongated shape and, similarly, the second elongated shape has a second minor axis and a second major axis. The second minor axis is perpendicular to the second major axis. The second minor axis is shorter than the second major axis. The first flexible member is stiffer than the second flexible member. The process of connecting the second flexible member to the first flexible member connects opposite sides of the first flexible member along the first minor axis to opposite ends of the second flexible member. Operation of the actuator multiplies mechanical transformations of the second flexible member relative to the mechanical transformations of the actuator based on a magnification ratio of longer to shorter axes of the first flexible member and the second flexible member.

In some embodiments of the invention, the first flexible member is connected to the second flexible member using linear members (e.g., rods, etc.). The linear members have two ends (first ends and second ends) opposite one another. The first ends of the linear members are connected to opposite sides of the first flexible member along the first minor axis of the first flexible member. The process of connecting the first flexible member to the second flexible member connects the second ends of the linear members to opposite ends of the second flexible member along the second major axis of the second flexible member.

In additional embodiments of the invention, secondary linear members are connected to the second flexible member. The secondary linear members also have two ends (third ends and fourth ends) opposite one another. The process of connecting the secondary linear members to the second flexible member connects the third ends of the secondary linear members to opposite sides of the second flexible member along the second minor axis of the second flexible member.

Further, a third flexible member is connected to the secondary linear members. The third flexible member has a third elongated shape and the third elongated shape has a third minor axis and a third major axis. The third minor axis is perpendicular to the third major axis and the third minor axis is shorter than the third major axis. The first major axis is parallel to (and can be collinear with) the third major axis, and both the first major axis and the third major axis are perpendicular to the second major axis (and both can intersect the second major axis at its midpoint). Further, the second flexible member is stiffer than the third flexible member. The process of connecting the third flexible member to the secondary linear members connects the fourth ends of the secondary linear members to opposite ends of the third flexible member along the third major axis of the third flexible member.

In various embodiments of the invention, the relative positions of the first elongated shape and the second elongated shape are structures where either the first elongated shape is within a circumference of the second elongated shape, or the first elongated shape is outside the circumference of the second elongated shape.

In some embodiments of the invention, radiating pistons are connected to the second elongated shape. Further, multiple ones of the first elongated shape can be connected to the second elongated shape. The first elongated shape and the second elongated shape can be either an ellipse or a rhombus.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

As noted above, flextensional transducers are known and widely used for various applications e.g., civilian and military sonar systems, precision actuators and grippers for micro-machining and bio-medical applications, transducers for oil and gas services, underwater communications, steel production, injection molding, die casting, chemical production, etc. The present invention embodiments further expand the capabilities of the flextensional transduction principle and significantly improve the performance of the resulting transducers by multiplying mechanical transformation effect from individual flexes.

More specifically, the embodiments of the invention disclosed herein provide a multiplication effect that is achieved by driving one flex with another flex. This leads to a displacement magnification that is much greater than is achieved by single flex devices or devices with series or parallel arrangements of flextensional transducers.

In some embodiments one flexible member is within the circumference of another flexible member (e.g., concentric), while other flexible members are external to another. The longest length of the inner flexible member is positioned at 90° to the longest length of the outer flexible member. Push rods or linear members connecting the inner and outer flexible members are rigid so as to effectively transfer forces between the inner and outer flexible member. The flexible members can have different thicknesses depending on the application. Inner members can have different thicknesses from outer members in view of the different forces on these members.

Figure 1:
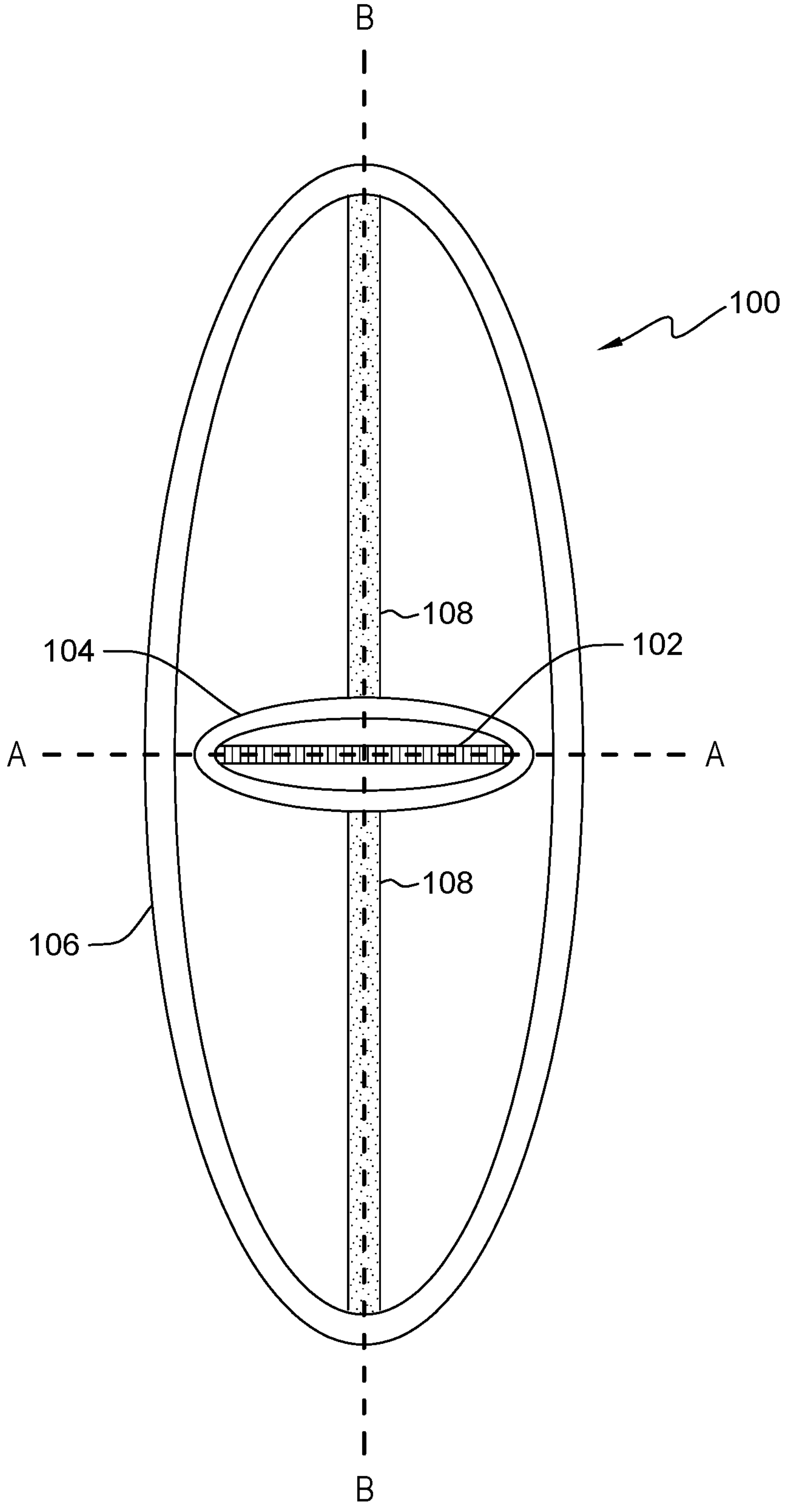
FIG. 1 illustrates a flextensional transducer according to a first embodiment with a first ellipse shaped flex member located in a second larger ellipse shaped flex member.

FIG. 1 shows one flextensional transducer 100 herein that includes two flextensional members and only one driver. An actuator 102 is operatively connected to a first flexible member 104. The actuator can be any form of force producing/receiving device including but not limited to electromagnetic motors, piezoelectric devices, shape-memory alloy components, etc.

The first flexible member 104 has a first elongated ellipse shape with a first minor axis (along reference line B-B) and a first major axis (along reference line A-A). The first minor axis is perpendicular to the first major axis, while the first minor axis is shorter than the first major axis. The process of connecting the actuator 102 to the first flexible member 104 connects the actuator 102 to opposite ends of the first flexible member 104 along the first major axis.

With such structures, a second flexible member 106 is connected to the first flexible member 104 by linear members 108. The second flexible member 106 has a second elongated ellipse shape and, similarly, the second elongated ellipse shape has a second minor axis (along reference line A-A) and a second major axis (along reference line B-B). The second minor axis is perpendicular to the second major axis, while the second minor axis is shorter than the second major axis. The process of connecting the second flexible member 106 to the first flexible member 104 connects opposite sides of the first flexible member 104 along the first minor axis to opposite ends of the second flexible member 106.

Flextensional transducer 100 operates in the following manner. Contraction of actuator 102 decreases the first major axis of first flexible member 104. This causes first flexible member 104 to increase its first minor axis pushing linear members 108 outward. Linear members 108 when pushed outward act to increase the second major axis of second flexible member 106. Increase of the second major axis causes contraction of second flexible member 106 at the second minor axis. The second minor axis reduction will be a much greater displacement than the displacement caused by actuator 102, as described below. Similarly, expansion or lengthening of actuator 102 will cause expansion of the second minor axis.

Linear members 108 have two ends (first ends and second ends) opposite one another (distal to one another). The first ends of the linear members 108 are connected to opposite sides of the first flexible member 104 along the first minor axis of the first flexible member 104. The second ends of the linear members 108 are connected to opposite ends of the second flexible member 106 along the second major axis of the second flexible member 106.

Transmission and/or reception operations of the actuator 102 multiplies mechanical transformations of the second flexible member 106 relative to the mechanical transformations of the actuator 102 based on a magnification ratio of longer (major) to shorter (minor) axes of the first flexible member 104 and the second flexible member 106.

Each flex has its own magnification ratio M defined as the ratio of the length of the longer axis to the length of the shorter axis. Thus, flex's 104 magnification ratio is M1=b/a where b is the length of the first major axis and a is the length of the first minor axis. Flex's 106 magnification ratio is M2=c/d where c is the length of the second major axis and d is the length of the second minor axis. Provided that linear members 108 are much stiffer (e.g., 10×, 50× 100×, etc., stiffer) than the flexes and the flex 104 is much stiffer (e.g., 10×, 50× 100×, etc., stiffer) than the flex 106, the combined magnification ratio of these double flex arrangement is $M_{total}$=M1*M2=bc/ad. For example, for M1=M2=5, the total magnification, $M_{total}$, is 25. This is a significant improvement over conventional serial connection arrangement of two flexes with two drives which would yield summation of magnification, i.e., magnification 5+5=10 using two drivers, as compared to one driver and magnification of 25 in this particular example.

Figure 2:
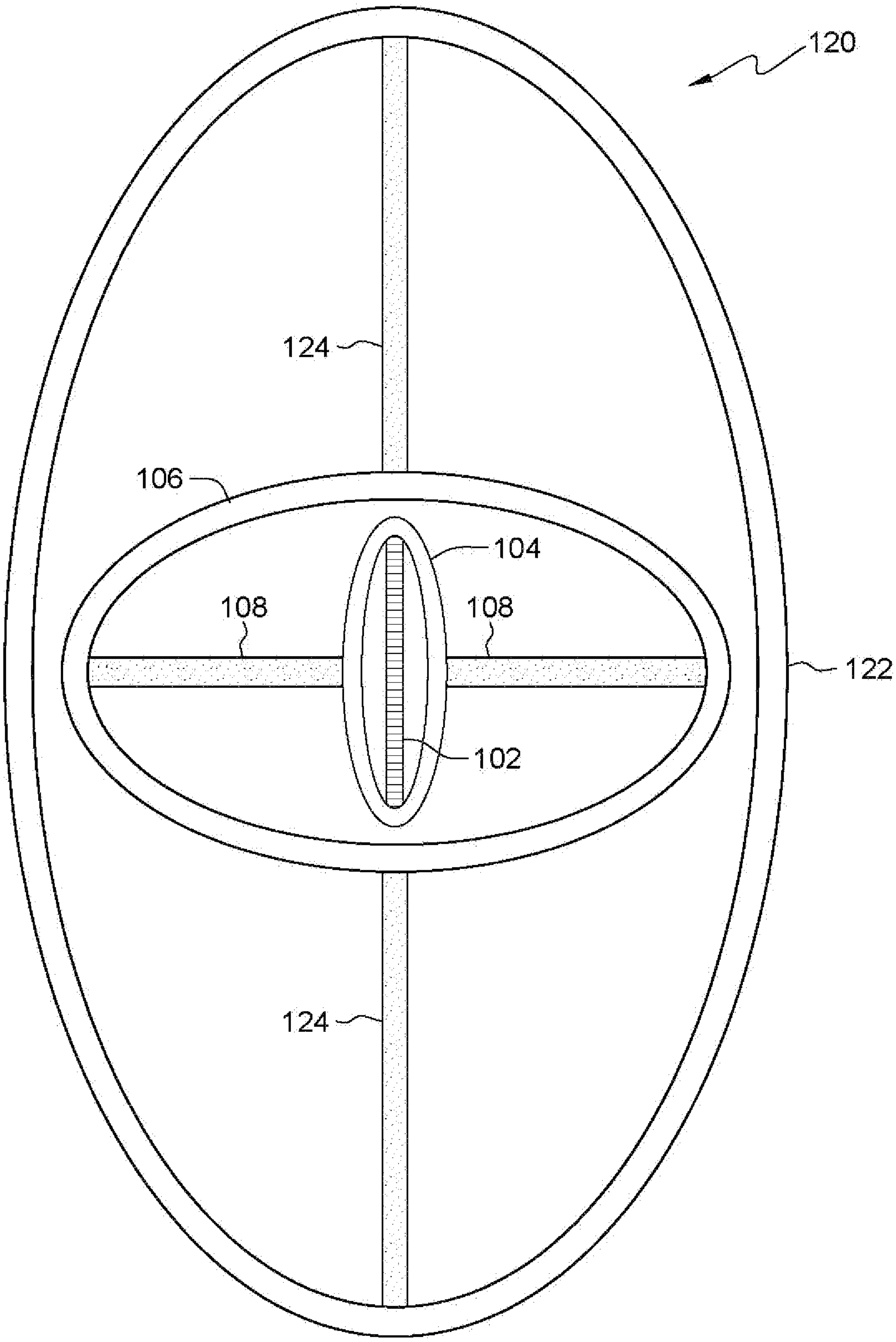
FIG. 2 illustrates a flextensional transducer according to a second embodiment utilizing three ellipse shaped flex members.

FIG. 2 shows an extension of the concepts demonstrated in the first embodiment. The multiplying effect can be further advanced using three or more flexes as illustrated in the flextensional transducer 120. In this embodiment, there is only one driver and three flexes connected with rigid linear members. More specifically, FIG. 2 illustrates secondary linear members 124 connected to the second flexible member 106. The secondary linear members 124 also have two distal ends (third ends and fourth ends) opposite one another. Third ends of the secondary linear members 124 are connected to opposite sides of the second flexible member 106 along the second minor axis of the second flexible member 106. Further, a third flexible member 122 is connected to the secondary linear members 124. The third flexible member 122 has a third elongated shape with a third minor axis and a third major axis. The process of connecting the third flexible member 122 to the secondary linear members 124 connects the fourth ends of the secondary linear members 124 to opposite ends of the third flexible member 122 along the third major axis of the third flexible member 122.

The third minor axis is perpendicular to the third major axis and the third minor axis is shorter than the third major axis. The first major axis is parallel to (and can be collinear with) the third major axis, and both the first major axis and the third major axis are perpendicular to the second major axis (and both can intersect the second major axis at its midpoint, as shown in FIG. 2). Further, the second flexible member 106 is stiffer than the third flexible member 122, and the first flexible member 104 is stiffer than the second flexible member 106.

The concepts shown in FIG. 2 can be extended to an arbitrary number of nested flexible members to achieve the desired amplification. A linear transducer can be positioned in an innermost flexible member. Multiple layers of outer flexible members can be positioned external to the innermost flexible member with each flexible member sized to accommodate the next smaller flexible member. Each smaller flexible member should be joined at its minor axis to the next larger flexible member at its major axis. Linear members can be used to provide this connection.

In each of the examples shown above, the stiffness, K, of the smaller flex is greater than stiffness of the larger flex. Again, the first flexible member 104 has a stiffness $K_1$ greater than the stiffness $K_2$ of the second flexible member 106. The second flexible member 106 stiffness $K_2$ is stiffer than third flexible member 122 stiffness $K_3$. Mathematically, this means $K_1>K_2>K_3$. Flexible member 122 has its own magnification ratio M3=e/f where e is the length of the third major axis and f is the length of the third minor axis. The total displacement magnification of this triple flex arrangement is $M_{total}$=M1*M2*M3=bce/adf. Again, if M1=M2=M3=5, the total magnification will be as high as 125 still using only one driver.

Figure 3:
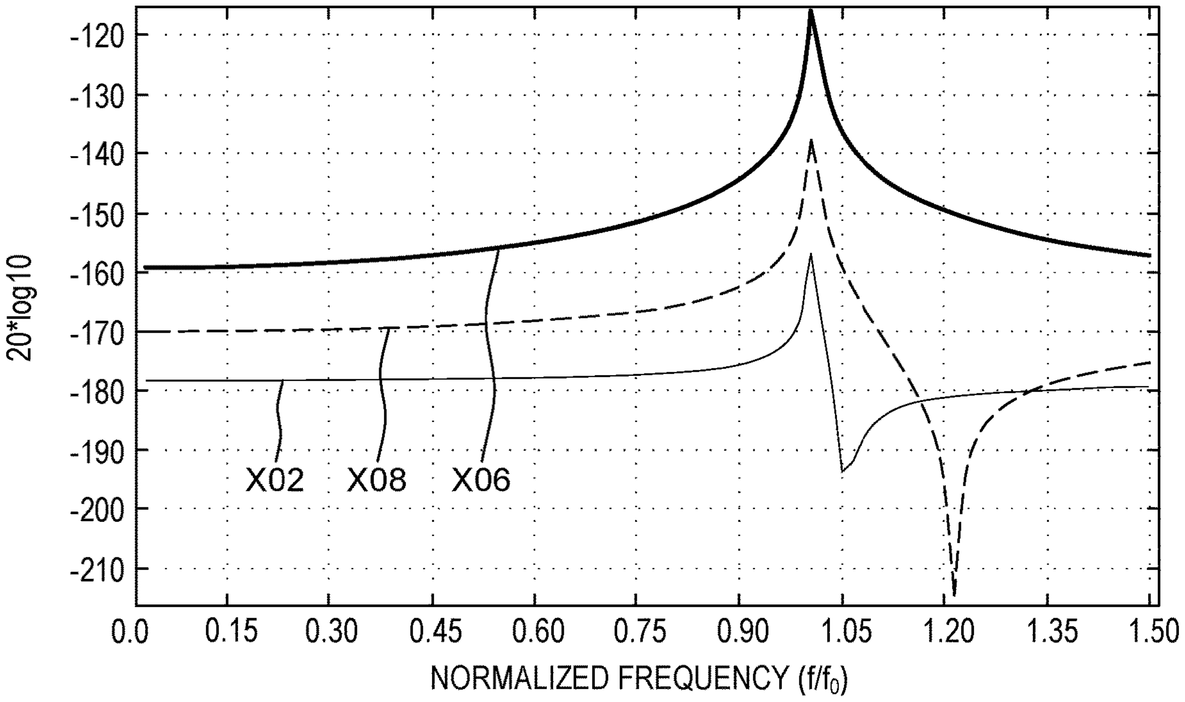
FIG. 3 is a graph illustrating performance of flextensional transducers according to embodiments herein.
Figure 4:
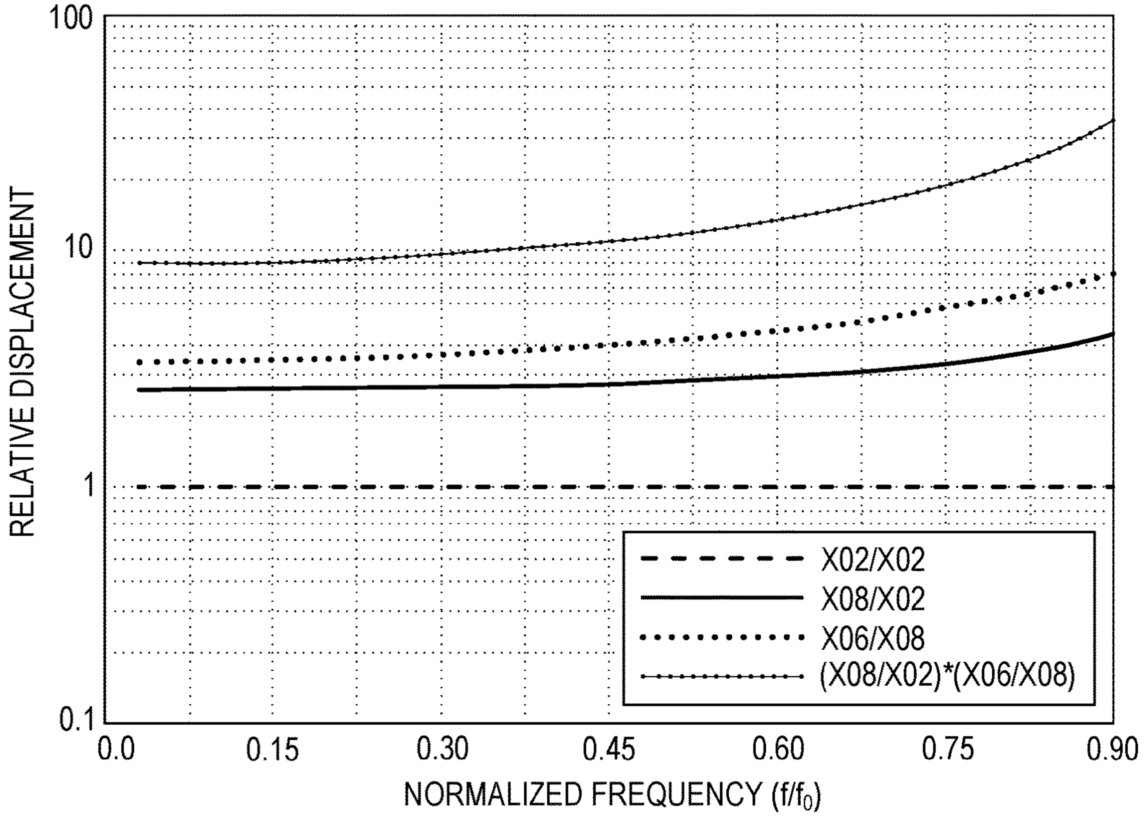
FIG. 4 is a graph illustrating performance of flextensional transducers according to embodiments herein.

FIGS. 3-4 show finite element results of the structure shown in FIG. 1, as a function of normalized frequency ($f/f_0$) where $f_0$ is the frequency at peak displacement. In greater detail, FIG. 3 is a graph of displacement (vertical axis) verses normalized frequency (horizontal axis) for elements 102, 106, and 108 shown in FIG. 1 wherein X02 is the horizontal displacement of element 102, X06 is the minor axis displacement of element 106, and X08 is the vertical displacement of element 108. The magnification factor can be seen when comparing the displacement X06 of the second flexible member 106 relative to the actuator 102, for example.

Similarly, FIG. 4 is a graph of displacement on the vertical axis versus normalized frequency ($f/f_0$) on the horizontal axis for element 102 displacement X02 relative to displacement X02 (X02/X02), element 106 minor axis displacement X06 relative to element 108 displacement X08 (X06/X08), element 108 displacement X08 relative to element 102 displacement X02 (X08/X02), and a measure of element 108 displacement X08 relative to element 102 displacement X02 multiplied by a measure of element 106 minor axis displacement X06 relative to element 108 displacement X08 ((X08/X02)*(X06/X08)). Again, the magnification factor can be seen when comparing the displacement of the second flexible member 106 relative to the actuator 102, for example.

Figure 5:
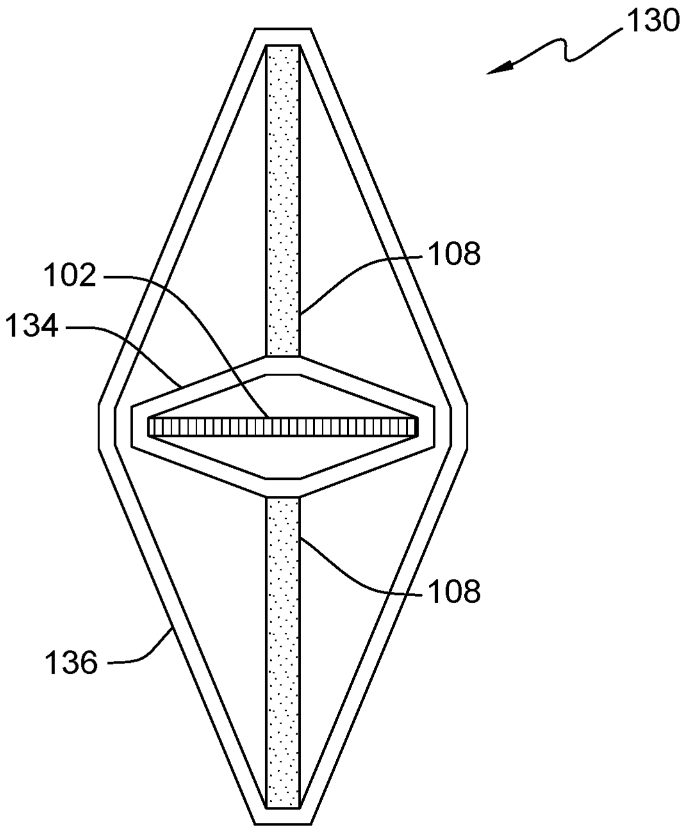
FIG. 5 illustrates a flextensional transducer according to a third embodiment utilizing two flex members.

FIG. 5 illustrates a similar flextensional transducer 130 as that shown in FIG. 1; however, in FIG. 5 the elongated shapes of the flexible members 104, 106 are changed to rhombuses. Specifically, the flextensional transducer 130 in FIG. 5 includes the actuator 102 directly connected to a first flexible member 134 that has a rhombus shape. The first flexible member 134 is directly connected to a rhombus-shaped second flexible member 136 by linear member 108. Again, this structure provides dramatically increased magnification of frequencies between the actuator 102 and the second flexible member 136. In some situations, the rhombus structure in FIG. 5 is referred to as an X-spring structure.

See J. L. Butler and C. H. Sherman "Transducers and Arrays for Underwater Sound," $2^{nd}$ Edition ASA and Springer, New York 2016, pp. 244-247.

Figure 6:
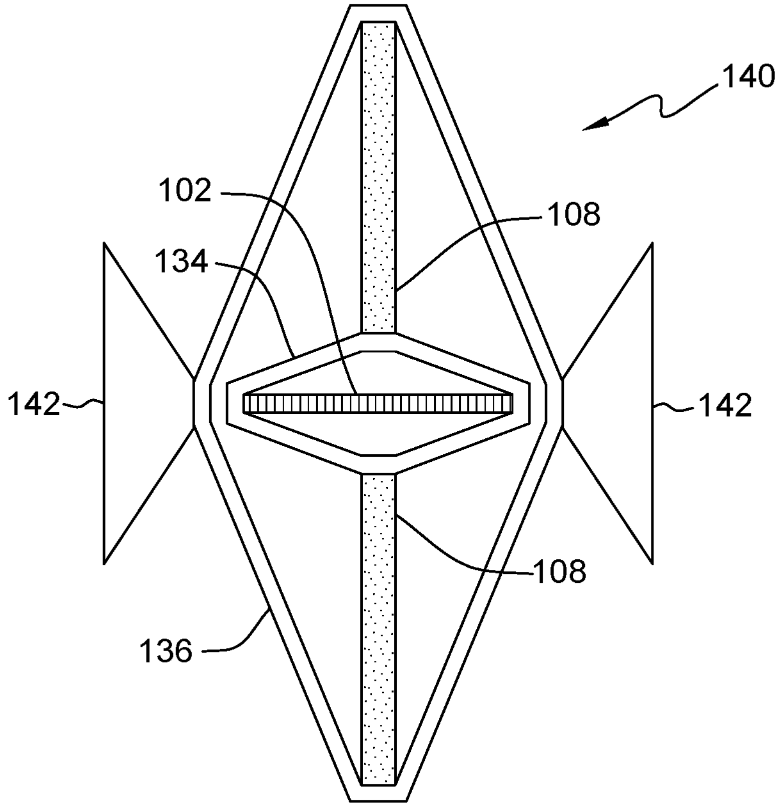
FIG. 6 illustrates a flextensional transducer according to a fourth embodiment utilizing two flex members.

FIG. 6 shows another embodiment of the inventive flextensional transducer 140 herein that is similar to that shown in FIG. 5; however, in FIG. 6 radiating pistons 142 are directly connected to the second flexible member 136. Radiating pistons 142 have a face in contact with an acoustic transmission medium such as air or water. The radiating pistons 142 are highly useful in, for example, sonar and similar applications of the flextensional transducer.

Figure 7:
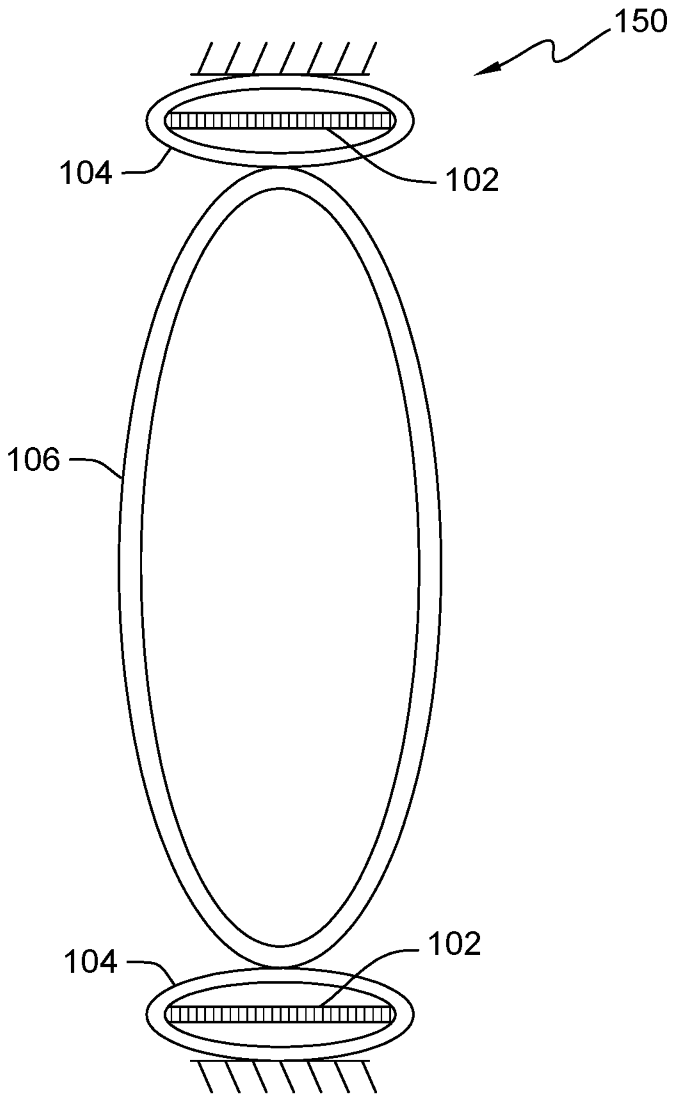
FIG. 7 illustrates a flextensional transducer according to a fifth embodiment utilizing three ellipse shaped flex members.

FIG. 7 shows another embodiment of the inventive flextensional transducer 150 herein that is similar to that shown in FIG. 1; however, in FIG. 7 two actuators 102 are connected within two first flexible members 104 and the two first flexible members 104 are directly connected to opposite ends of the second flexible member 106. Further, the sides of the first flexible members 104 opposite to where the first flexible members 104 connect to the second flexible member 106 are connected to a ridged structure to help transmit vibrations from the second flexible member 106 to the actuator 102 through the rigidly mounted first flexible members 104.

Figure 8:
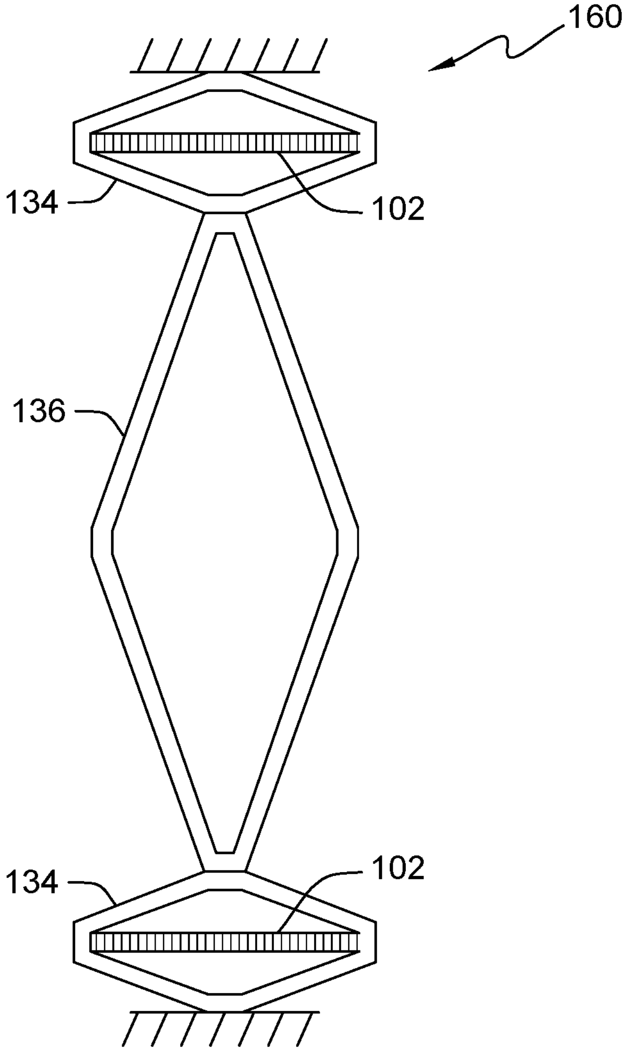
FIG. 8 illustrates a flextensional transducer according to a sixth embodiment utilizing three flex members.

FIG. 8 shows another embodiment of the inventive flextensional transducer 160 herein that is similar to that shown in FIG. 5; however, in FIG. 8 two actuators 102 are connected within two first flexible members 134 and the two first flexible members 134 are directly connected to opposite ends of the second flexible member 136. Further, the sides of the first flexible members 134 opposite to where the first flexible members 134 connect to the second flexible member 136 are connected to a ridged structure to help transmit vibrations from the second flexible member 136 to the actuator 102 through the rigidly mounted first flexible members 134.

Figure 9:
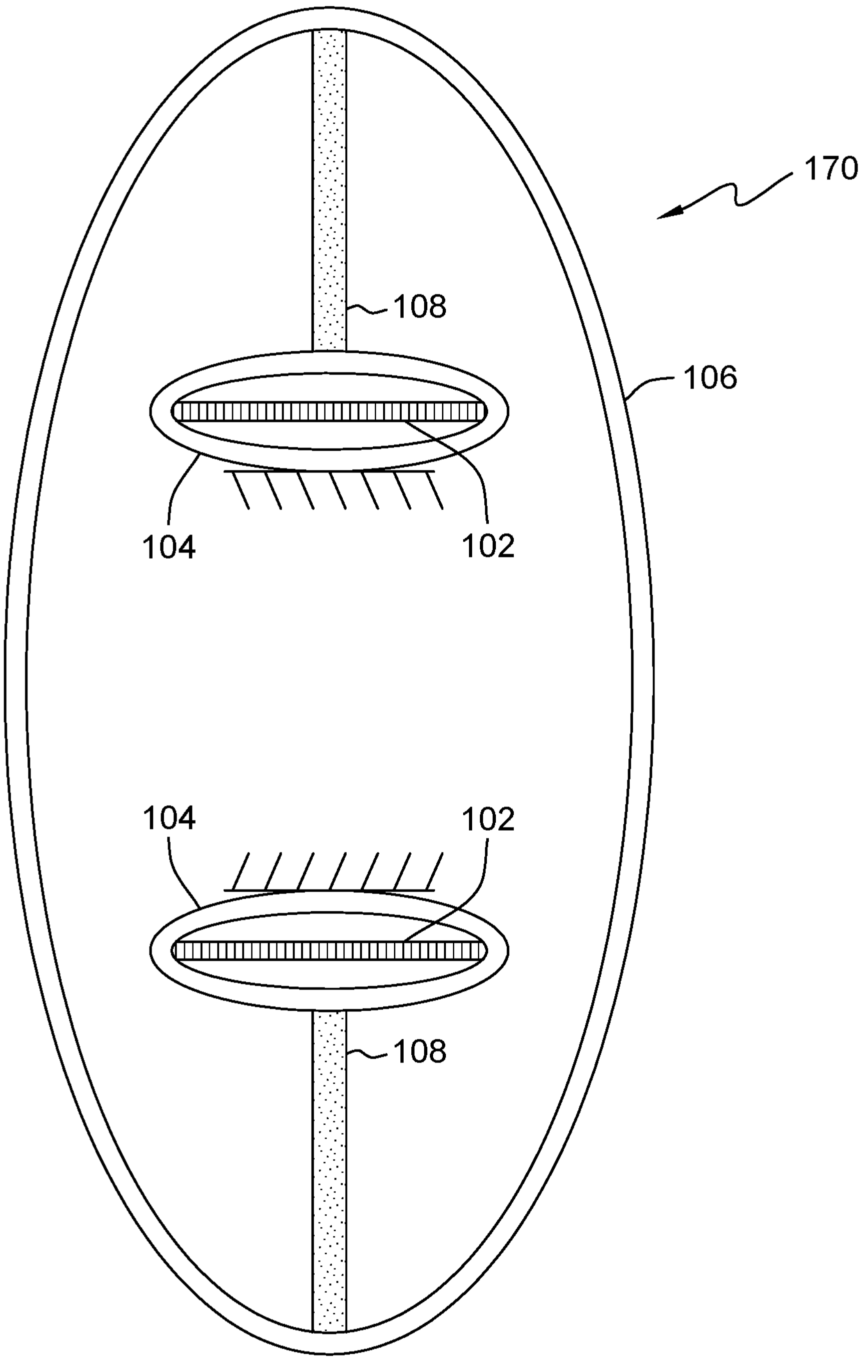
FIG. 9 illustrates a flextensional transducer according to a seventh embodiment utilizing three ellipse shaped flex members.

FIG. 9 illustrates a flextensional transducer 170 that is similar to the structure shown in FIG. 7 and includes two rigidly mounted first flexible members 104 (each surrounding an actuator 102). However, in FIG. 9 the rigidly mounted first flexible members 104 are within the second flexible member 106. Further, in the structure shown in FIG. 9, the second flexible member 106 is indirectly connected to the first flexible members 104 through the linear members 108.

Figure 10:
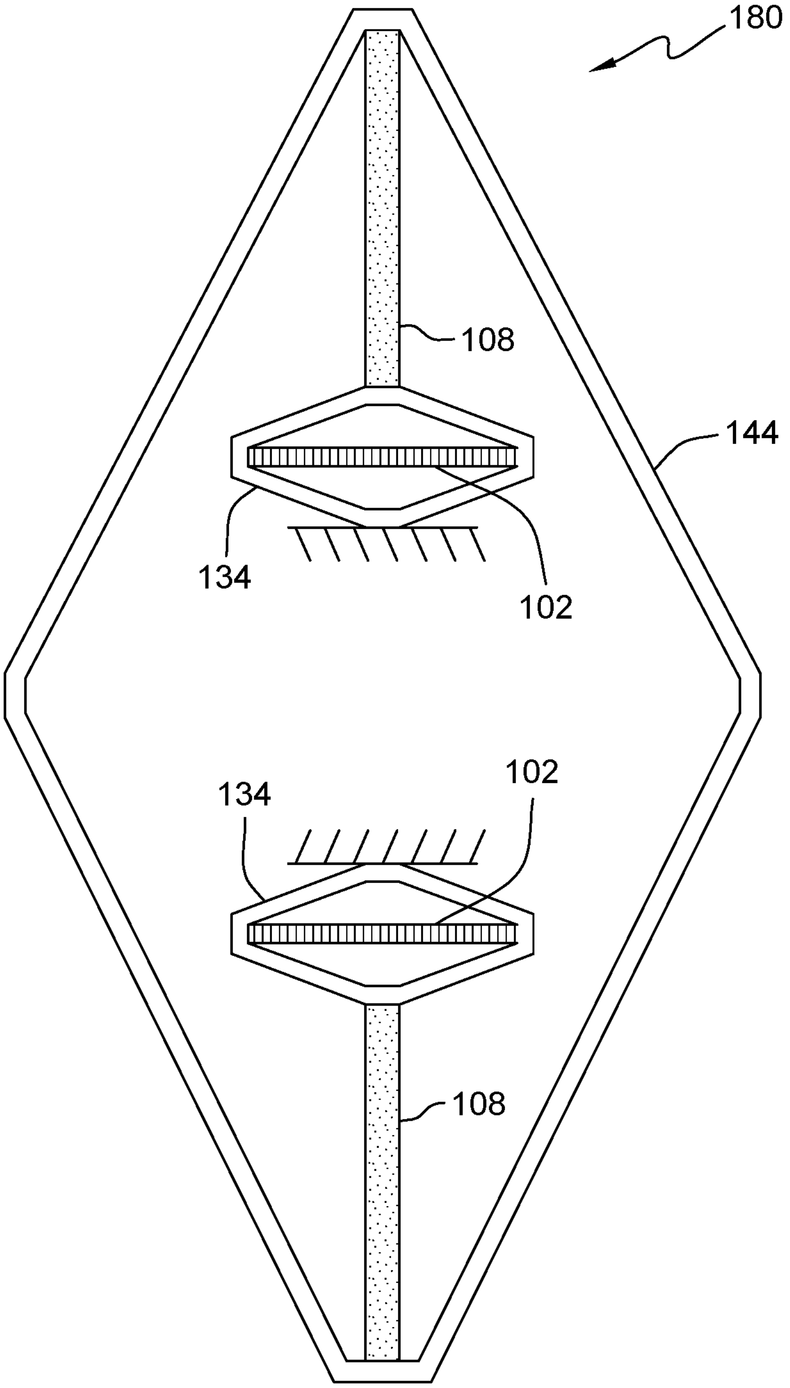
FIG. 10 illustrates a flextensional transducer according to an eighth embodiment utilizing three flex members.

FIG. 10 illustrates a flextensional transducer 180 that is similar to the structure shown in FIG. 8 and includes two rigidly mounted first flexible members 134 (each surrounding an actuator 102). However, in FIG. 10 the rigidly mounted first flexible members 134 are within the second flexible member 144. Further, in the structure shown in FIG. 10, the second flexible member 144 is indirectly connected to the first flexible members 134 through the linear members 108.

Figure 11:
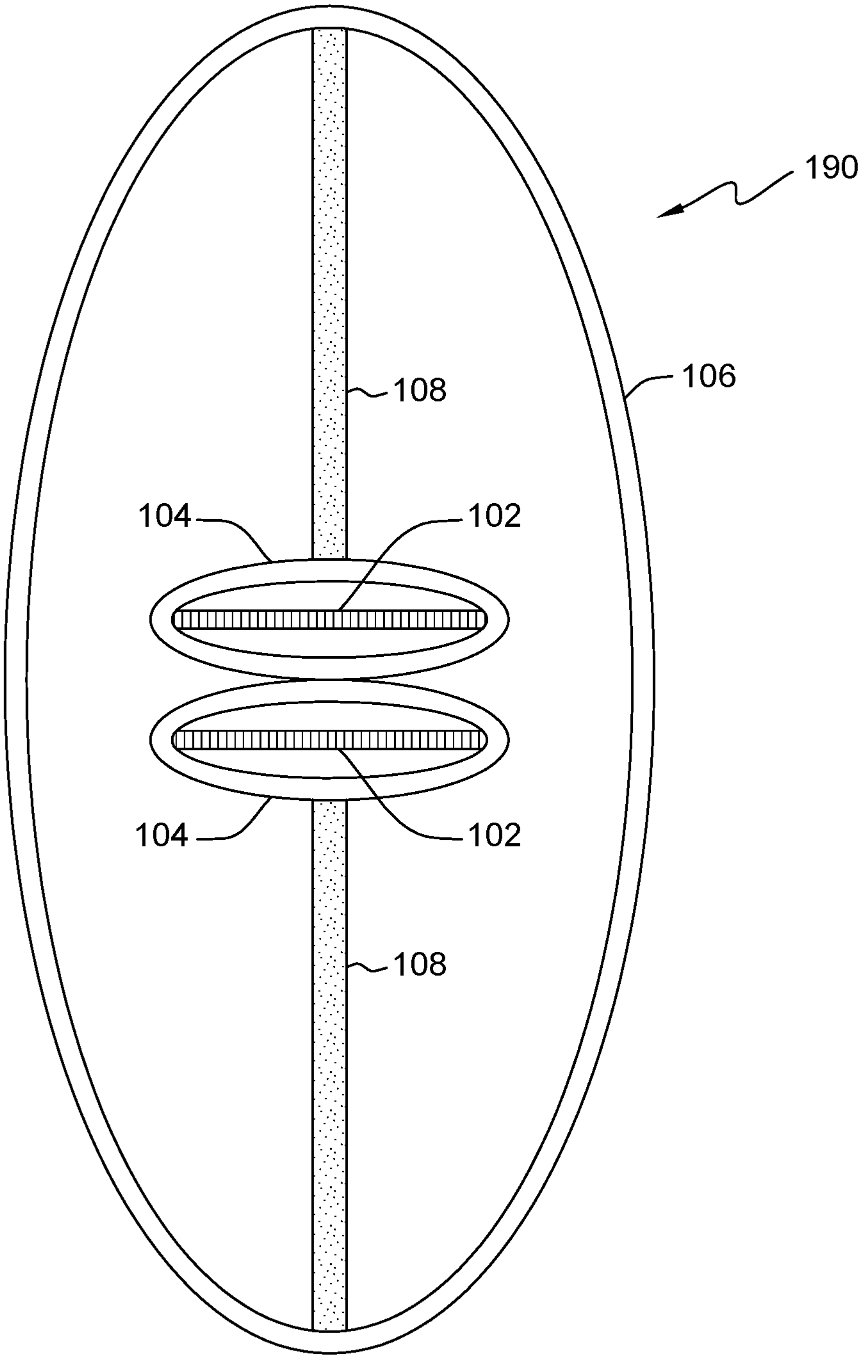
FIG. 11 illustrates a flextensional transducer according to a ninth embodiment utilizing three ellipse shaped flex members.

FIG. 11 illustrates a flextensional transducer 190 that is similar to the structure shown in FIG. 1. However, the structure in FIG. 11 includes two first flexible members 104 directly connected to each other within the second flexible member 106. Further, the sides of the first flexible members 104 opposite to where the first flexible members 104 connect to each other are connected to the linear members 108.

Figure 12:
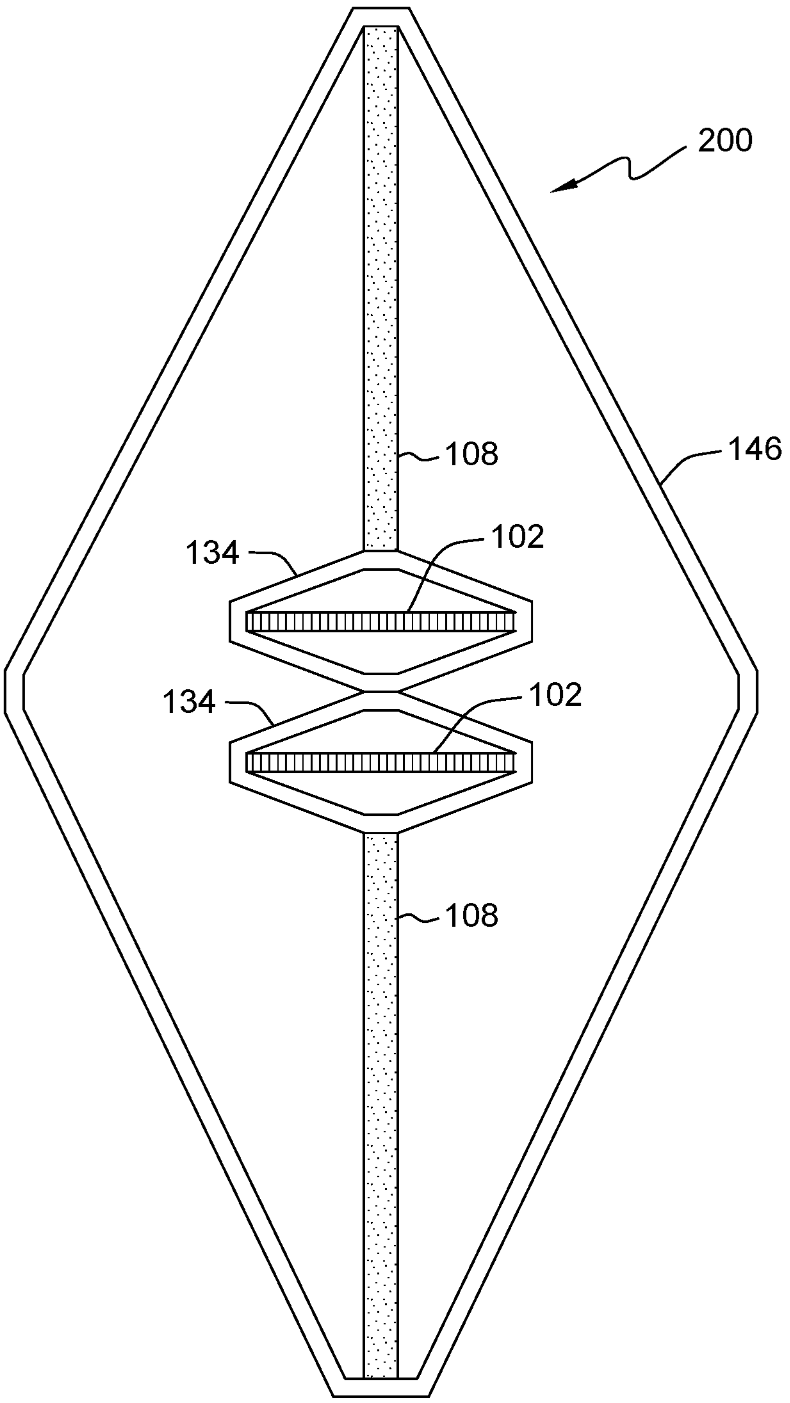
FIG. 12 illustrates a flextensional transducer according to a tenth embodiment utilizing three flex members.

FIG. 12 illustrates a flextensional transducer 200 that is similar to the structure shown in FIG. 10. However, in the structure in FIG. 12, the two first flexible members 134 are directly connected to each other within the second flexible member 146, rather than being rigidly mounted. Further, the sides of the first flexible members 134 opposite to where the first flexible members 104 connect to each other are connected to the linear members 108.

Figure 13:
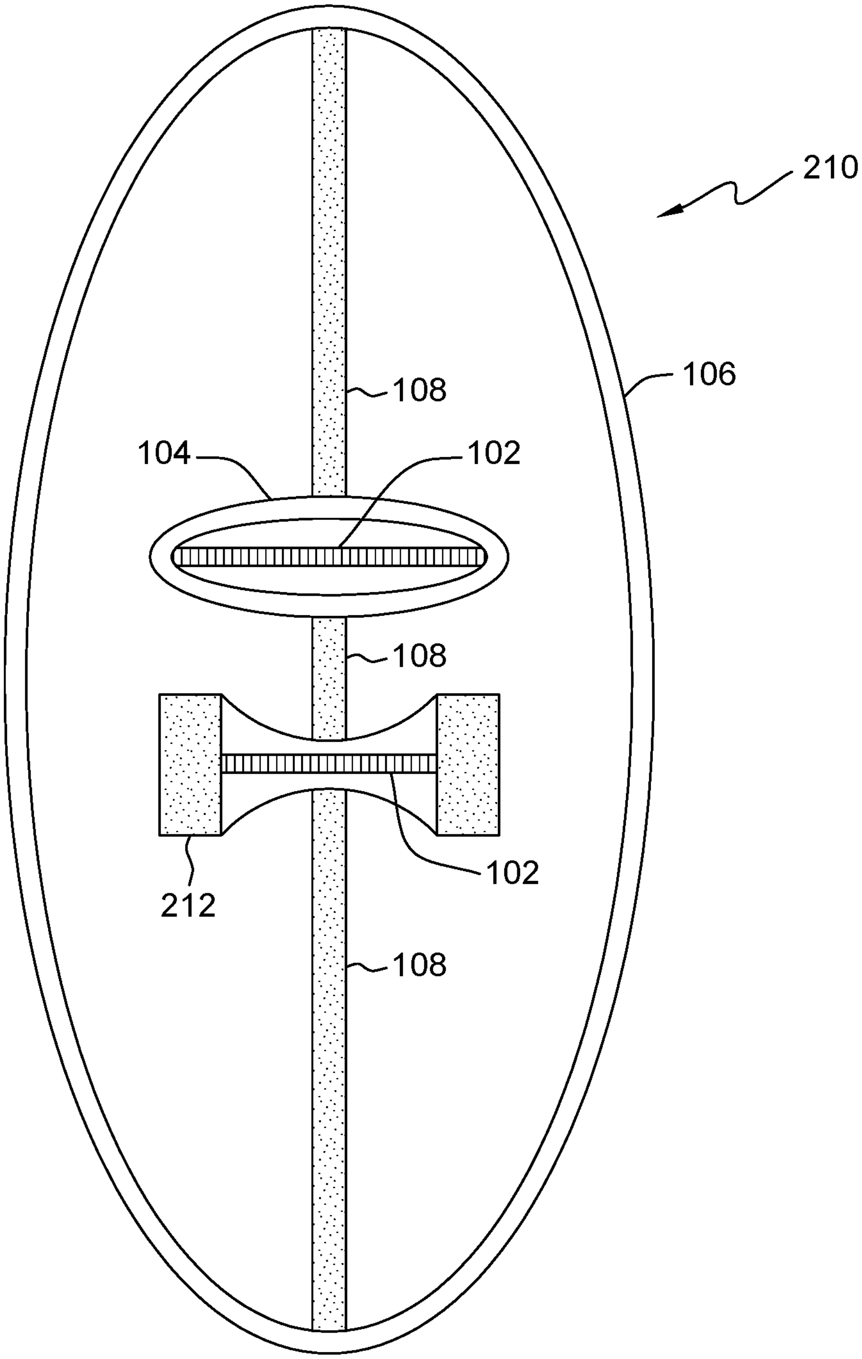
FIG. 13 illustrates a flextensional transducer according to an eleventh embodiment utilizing three flex members.

FIG. 13 illustrates a flextensional transducer 210 that is similar to the structure shown in FIG. 11; however, a dog bone-shaped flexible member structure 212 is substituted for one of the first flexible members 104 shown in FIG. 11. The dog bone-shaped flexible member 212 includes concave flexible surfaces in place of the convex circumference of the elliptical shaped surface of the first flexible members 104 shown in FIG. 11. Further, an additional linear member 108 connects the first flexible member 104 to the dog bone-shaped flexible member 212 within the circumference of the second flexible member 106. The actuator 102 in dog bone-shaped flexible member 212 should be electrically driven out of phase from that of actuator 102 in ellipse-shaped flex since dog bone-shaped flexible member 212 has a concave shape.

Figure 14:
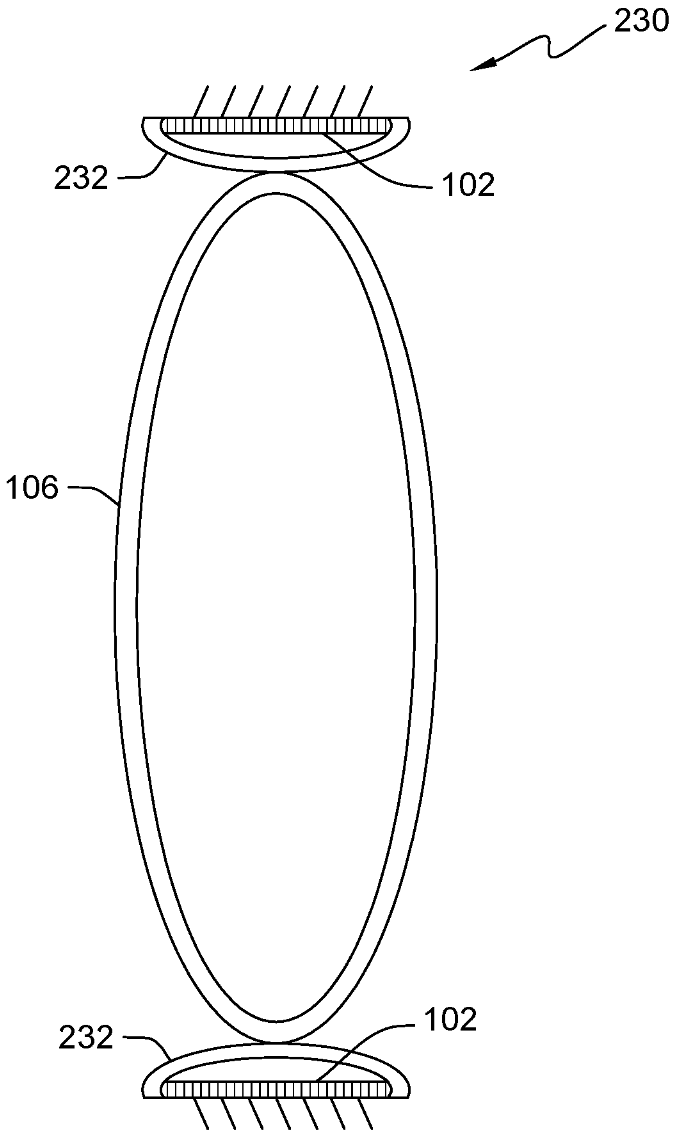
FIG. 14 illustrates a flextensional transducer according to a twelfth embodiment utilizing flex members.

The flextensional transducer 230 shown in FIG. 14 is similar to the structure shown in FIG. 7; however, the structure shown in FIG. 14 uses half-ellipse flexible members 232 in place of the full ellipse flexible members 104 that are used in FIG. 7.

Figure 15:
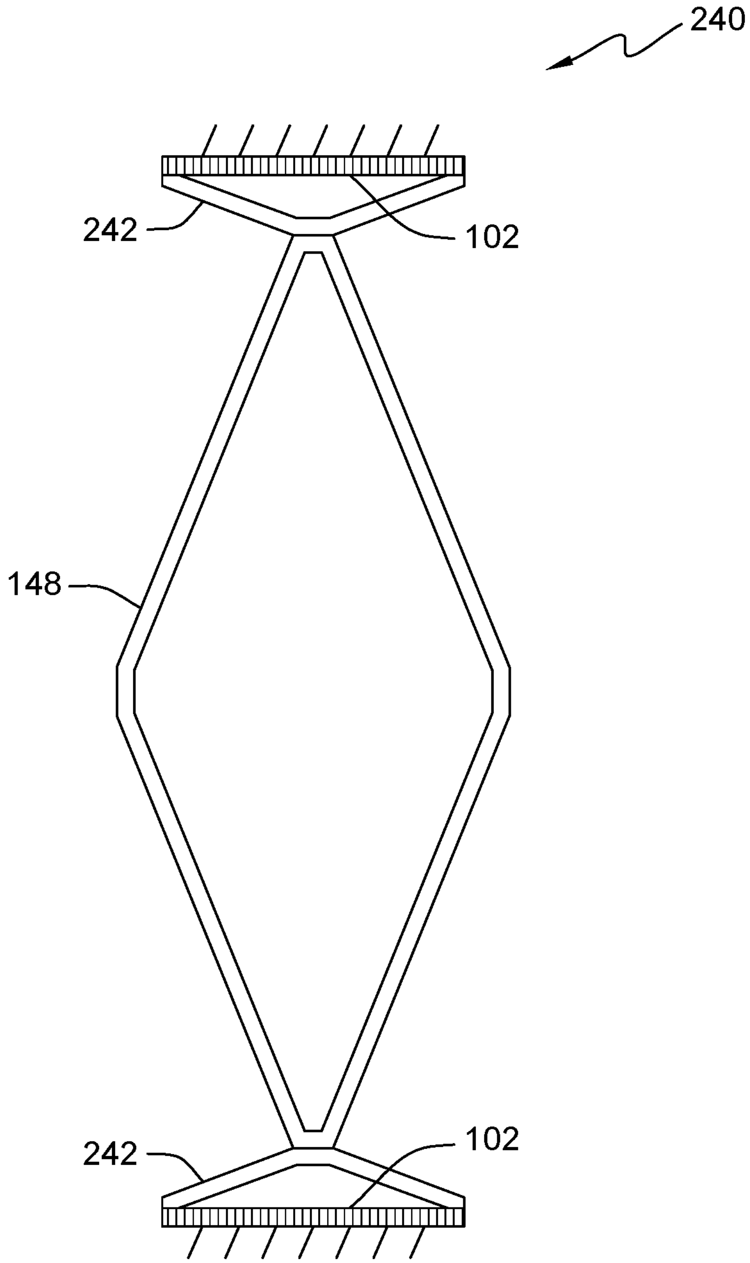
FIG. 15 illustrates a flextensional transducer according to a thirteenth embodiment utilizing flex members.

The flextensional transducer 240 shown in FIG. 15 is similar to the structure shown in FIG. 8; however, the structure shown in FIG. 15 uses half-rhombus or triangular flexible members 242 in place of the full rhombus flexible members 148 that are used in FIG. 8.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

What is claimed is:

1. A flextensional amplifier comprising:

a linear transducer;

a first flexible member operatively connected to said transducer, said first flexible member having a first elongated shape with a first minor axis and a first major axis, said first minor axis being perpendicular to said first major axis, said first minor axis being shorter than said first major axis, and said transducer being connected to opposite portions of said first flexible member along said first major axis;

a second flexible member having a second elongated shape with a second minor axis and a second major axis, said second minor axis being perpendicular to said second major axis, said second minor axis being shorter than said second major axis, and said first flexible member first major axis being perpendicular to said second major axis, and said second flexible member being operatively connected at said second major axis to said first flexible member at said first flexible member first minor axis wherein said first flexible member is within a perimeter of said second flexible member and whereby linear translation of said transducer along said first flexible member first minor axis results in multiplicative linear translation of said flexible second member along said second minor axis; and linear members connecting said first flexible member to said second flexible member, said linear members having first ends and second ends opposite one another, said first ends of said linear members being connected to said first flexible member along said first minor axis of said first flexible member, and said second ends of said linear members being connected to said second flexible member along said second flexible member second major axis;

wherein said first elongated shape is an ellipse, and said second elongated shape is a rhombus.

2. A flextensional amplifier comprising:

a linear transducer;

a first flexible member operatively connected to said transducer, said first flexible member having a first elongated shape with a first minor axis and a first major axis, said first minor axis being perpendicular to said first major axis, said first minor axis being shorter than said first major axis, and said transducer being connected to opposite portions of said first flexible member along said first major axis;

a second flexible member having a second elongated shape with a second minor axis and a second major axis, said second minor axis being perpendicular to said second major axis, said second minor axis being shorter than said second major axis, and said first flexible member first major axis being perpendicular to said second major axis, and said second flexible member being operatively connected at said second major axis to said first flexible member at said first flexible member first minor axis wherein said first flexible member is within a perimeter of said second flexible member and whereby linear translation of said transducer along said first flexible member first minor axis results in multiplicative linear translation of said flexible second member along said second minor axis; and linear members connecting said first flexible member to said second flexible member, said linear members having first ends and second ends opposite one another, said first ends of said linear members being connected to said first flexible member along said first minor axis of said first flexible member, and said second ends of said linear members being connected to said second flexible member along said second flexible member second major axis;

wherein said first elongated shape is a rhombus, and said second elongated shape is an ellipse.

3. A flextensional amplifier comprising:

a linear transducer;

an innermost flexible member having an innermost elongated shape with an innermost minor axis and an innermost major axis, said innermost minor axis being perpendicular to said innermost major axis, said innermost minor axis being shorter than said innermost major axis, said linear transducer being joined to said innermost flexible member where the innermost major axis contacts the innermost flexible member;

at least one outer flexible member sized to accommodate at least one smaller flexible member and positioned about the smaller flexible member, the innermost outer flexible member being positioned about said innermost flexible member, each said outer flexible member having an outer elongated shape with a sized outer minor axis and a sized outer major axis, said sized outer minor axis being smaller than said sized outer major axis, said outer flexible member being joined at the sized major axis to the smaller flexible member at the smaller flexible member minor axis whereby the outermost of said at least one outer flexible member provides amplified motion of said linear transducer at the sized outer minor axis thereof; and a plurality of linear members connecting a smaller flexible member minor axis to said outer flexible member sized major axis wherein said innermost flexible member has a higher stiffness than said at least one outer flexible member, and said successive outer flexible members each have a lower stiffness than the smaller flexible member.

* * * * *